United States Patent [19]

Kawamoto et al.

[11] Patent Number: 4,866,625

[45] Date of Patent: Sep. 12, 1989

[54] FOUR-WHEEL DRIVE VEHICLE HAVING ANTISLIP APPARATUS

[75] Inventors: Mutumi Kawamoto; Takashi Yamada; Mitugu Tatuta, all of Anjo, Japan

[73] Assignees: Aisin-Warner Kabushiki Kaisha; Kabushiki Kaisha Shinsangyokaihatsu, Aichi, Japan

[21] Appl. No.: 68,676

[22] Filed: Jun. 30, 1987

[30] Foreign Application Priority Data

Jun. 30, 1986 [JP] Japan ................... 61-154322
Jun. 30, 1986 [JP] Japan ................... 61-154325

[51] Int. Cl.⁴ ............................................. B60T 8/58
[52] U.S. Cl. ......................... 364/426.02; 180/233; 180/249; 303/107
[58] Field of Search ............. 180/197, 248, 249, 233; 303/107, 100, 110, 96, 97, 95; 364/426, 424.1, 426.01, 426.02; 74/665 T; 361/238

[56] References Cited

U.S. PATENT DOCUMENTS

| | | | |
|---|---|---|---|
| 4,471,438 | 9/1984 | Futagi et al. ................... | 364/424.1 |
| 4,558,414 | 12/1985 | Sakakiyama ................... | 364/424.1 |
| 4,566,554 | 1/1986 | Suzuki ................... | 180/249 |
| 4,613,008 | 9/1986 | Hiraiwa et al. ................... | 180/167 X |
| 4,662,686 | 5/1987 | Matsuda ................... | 364/426 X |
| 4,671,138 | 6/1987 | Nobumoto et al. ................... | 364/424.1 X |
| 4,711,318 | 12/1987 | Kitade ................... | 180/197 X |
| 4,727,966 | 5/1988 | Hiramatsu et al. ................... | 192/0.033 |
| 4,744,437 | 5/1988 | Matsumoto ................... | 180/249 |
| 4,754,835 | 7/1988 | Stelter et al. ................... | 180/248 |
| 4,765,434 | 8/1988 | Kawamoto et al. ................... | 180/249 |

FOREIGN PATENT DOCUMENTS

| | | | |
|---|---|---|---|
| 3206694 | 9/1983 | Fed. Rep. of Germany ...... | 180/197 |
| 0056922 | 4/1983 | Japan . | |
| 60-135327 | 7/1985 | Japan . | |
| 2111151 | 6/1983 | United Kingdom ................... | 303/107 |
| 2114252 | 8/1983 | United Kingdom . | |
| 2118267 | 10/1983 | United Kingdom . | |
| 2118666 | 11/1983 | United Kingdom . | |
| 2140104A | 11/1984 | United Kingdom . | |
| 2146961 | 5/1985 | United Kingdom . | |
| 2158270 | 11/1985 | United Kingdom ................... | 180/197 |

Primary Examiner—Eugene R. LaRoche
Assistant Examiner—Seung Ham
Attorney, Agent, or Firm—Varndell Legal Group

[57] ABSTRACT

A four-wheel drive vehicle having a front- and rear-wheel engaging mechanism designed to enable differential limiting means provided between the front and rear wheels to be controlled over the range from the direct coupling position to the disengaged position through the slip region by the control of the degree of engagement. The vehicle is provided with engaging means for driving the front- and rear-wheel engaging mechanism at a set degree of engagement, wheel acceleration detecting means, reference acceleration detecting means, and control means for controlling the engaging means by setting a degree of engagement on the basis of the result of a comparison between the detected acceleration of rotation of the wheels and the detected reference acceleration. Alternatively, the vehicle is provided with engaging means for driving the front- and rear-wheel engaging mechanism at a set degree of engagement, acceleration detecting means for detecting accelerations of rotation of the front and rear wheels, and control means for controlling the engaging means by setting a degree of engagement on the basis of the result of a comparison between the detected accelerations of rotation of the front and rear wheels. Thus, when the occurrence of slip is detected, the degree of engagement of the front- and rear-wheel engaging mechanism is controlled in accordance with the degree of slip. Accordingly, it is possible to effectively prevent the vehicle from slipping.

16 Claims, 6 Drawing Sheets

REFERENCE ACCELERATION MAP

SOLENOID DUTY RATIO MAP

| ACCELERATION RATIO | 1.0 ⟶ 2.0 |
|---|---|
| DUTY RATIO | 0% ⟶ 100% |

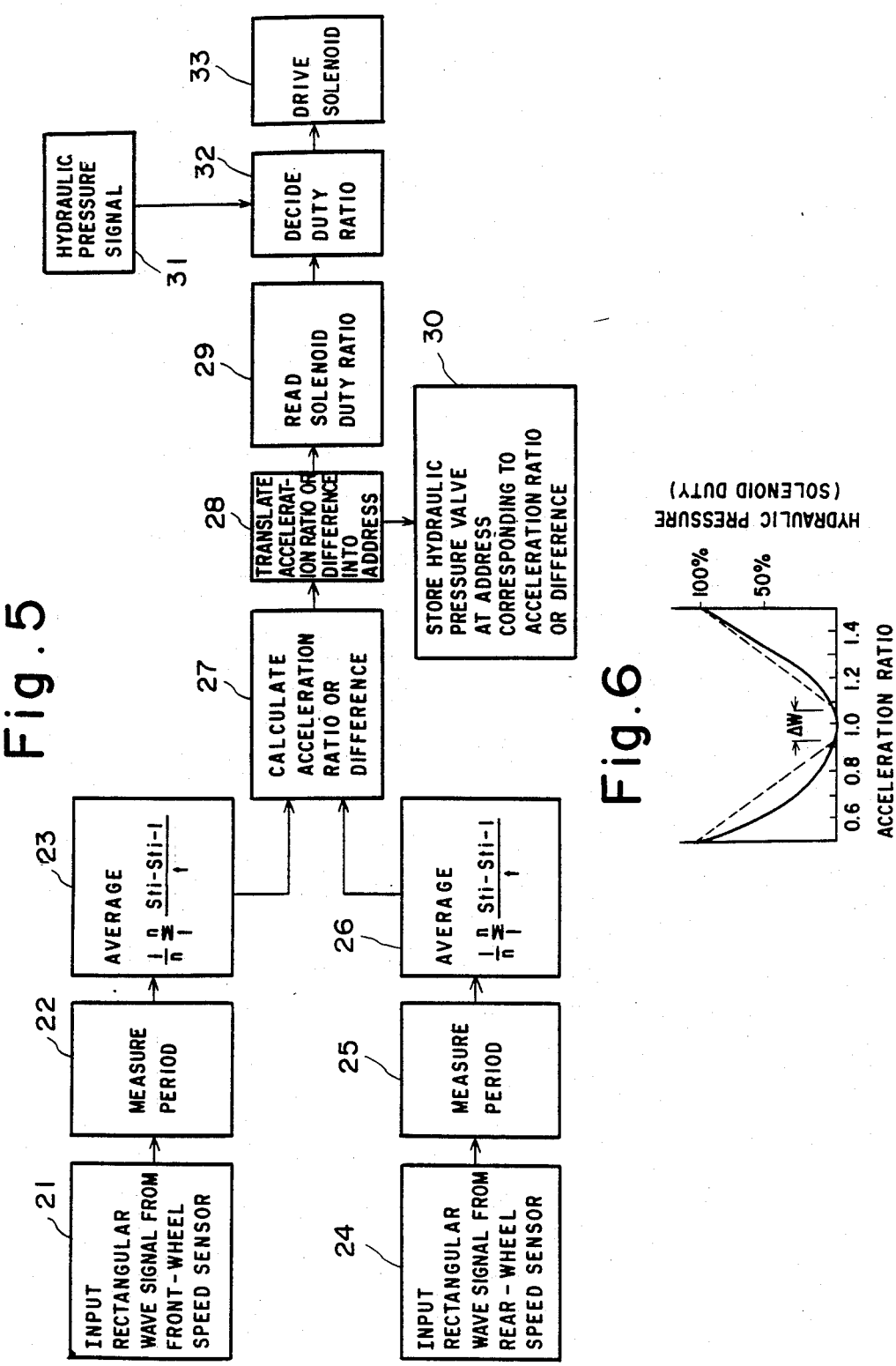

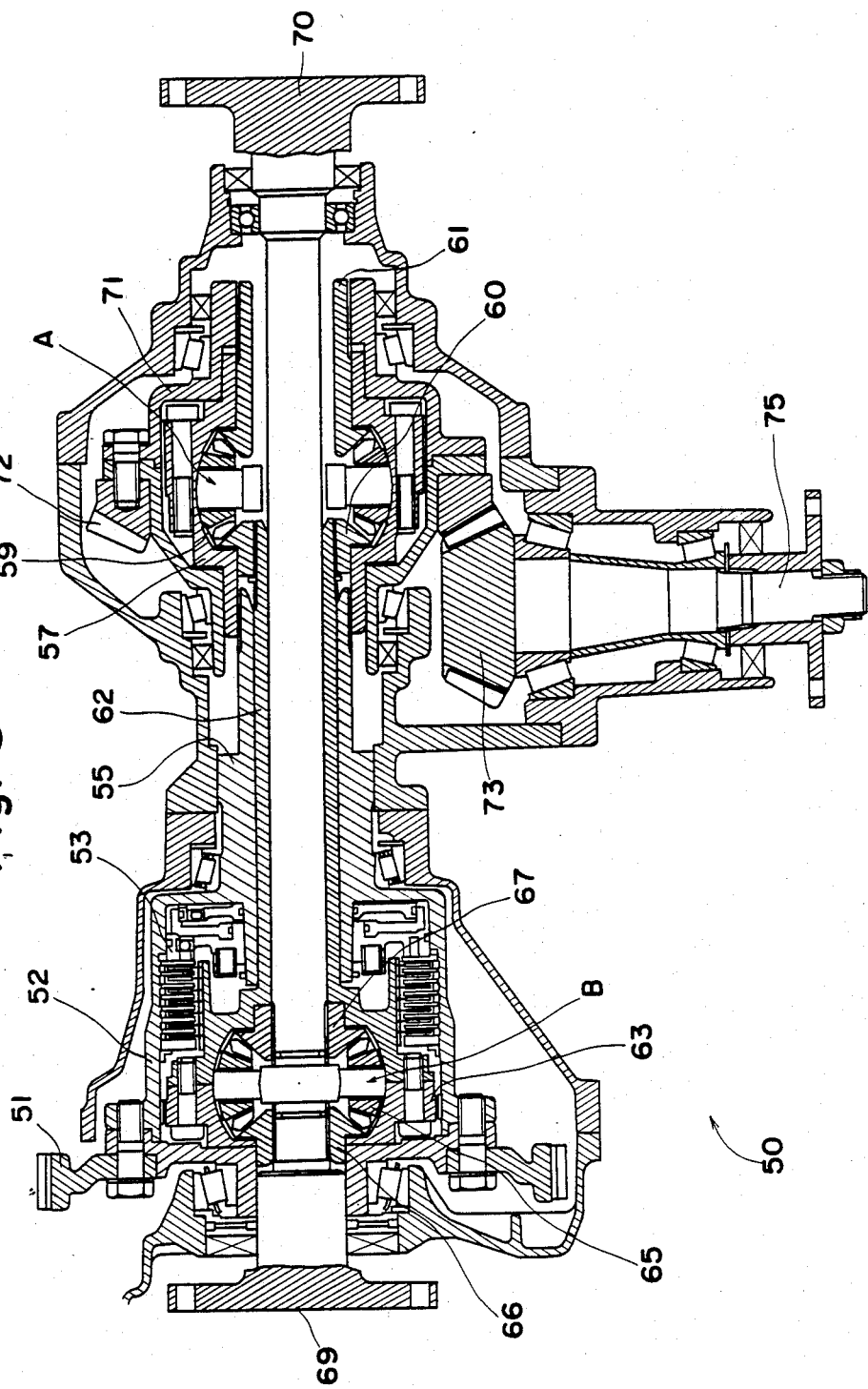

FOUR-WHEEL DRIVE VEHICLE HAVING ANTISLIP APPARATUS

BACKGROUND OF THE INVENTION

The present invention relates to a four-wheel drive vehicle having an antislip apparatus designed to prevent the occurrence of slip by detecting and comparing two different kinds of acceleration, and controlling the degree of engagement of a front- and rear-wheel engaging means on the basis of the result of the comparison.

Generally, in the running of automobiles the front wheel drive is superior to the rear wheel drive in straight running stability, but during cornering the front wheel drive meets with the problem that it is relatively difficult to turn the car because force must be applied to the tires through the steering wheel so that the tires are kept from returning to the normal position that is assumed during the straight running. On the other hand, the rear wheel drive enables the car to corner relatively easily, but it involves the disadvantage that excessively large drive power may cause the car to turn more than is desired. Accordingly, it is ideal practice from the viewpoint of running of automobiles to drive the front and rear wheels evenly with substantially equal powers, and four-wheel drive vehicles are considerably superior from this point of view.

During cornering right and left wheels of a car have different radii of rotation. Therefore, in order to absorb the difference and to thereby enable smooth cornering automobiles are generally provided with mechanisms designed to absorb the difference in number of revolutions between the right and left wheels in accordance with the difference in the radius of rotation, i.e., differential mechanisms (front and rear differential mechanisms). The difference in the radius of rotation also occurs between the front and rear wheels. Therefore, there has been proposed one type of four-wheel drive vehicle which is provided with a mechanism adapted for absorbing the difference in number of revolutions between the front and rear wheels in accordance with the difference in the radius of rotation, i.e., the center differential mechanism.

This center differential mechanism suffers, however, from the following problem. Since the mechanism is adapted to distribute torque evenly to the front and rear wheels, the power transmission limit is balanced with the one of the driving forces acting on the front and rear wheels which has a lower value. For example, if one of the front wheels slips, the driving energy escapes from the slipping wheel, so that the driving force for the rear wheels becomes extremely small. For this reason, a four-wheel drive vehicle with a center differential mechanism may be inferior to a four-wheel drive vehicle with no center differential mechanism in terms of the transmission of drive power when, for example, the vehicle is running on a road surface having a relatively small coefficient of friction. Accordingly, when relatively large drive power is generated during, for example, acceleration, it may be impossible to sufficiently transmit the drive power to the road surface, resulting in the front or rear wheels slipping undesirably.

In order to prevent the occurrence of such an unfavorable phenomenon, a four-wheel drive vehicle with a center differential mechanism has heretofore been provided with a lock mechanism which is adapted to directly couple together the differential limiting means for the front and rear wheels without interposition of the center differential mechanism therebetween, so that, when relatively large drive power is required, for example, when the vehicle is being accelerated or running on a rough road, the center differential mechanism is manually locked, whereas, when the vehicle is in a normal running state wherein no specially large drive power is needed, the center differential mechanism is manually unlocked.

FIG. 7 shows a power transmission mechanism employed in a full-time four-wheel drive vehicle with a center differential mechanism which has an engine mounted on the front side. In this power transmission mechanism, the power from the engine is transmitted to a torque converter 41, a main transmission gear 42 and a subsidiary transmission gear 43, which are disposed within an automatic transmission 40, and the output from the subsidiary transmission gear 43 is transmitted to a driving gear 44 and then to a front-wheel driving shaft 46 through the driving gear 44, thus driving the front wheels. The front differential mechanism 45 provided in this power transmission mechanism is a differential mechanism which acts between the right and left front wheel. On the other hand, a propeller shaft 47 for driving the rear wheels is coupled through a bevel gear 48 to a center differential mechanism 49 which is adapted to act between the front and rear wheels, the center differential mechanism 49 being coupled to a rear-wheel transmission 37. Further, a clutch 38 for locking the center differential mechanism 49 is disposed in parallel to it. Accordingly, the locking of the center differential mechanism 49 is controlled by controlling the engaged state of the clutch 38 by means of an oil-hydraulic circuit (pressure control solenoid) 39.

The above-described power transmission mechanism will be explained in more detail with reference to FIG. 8. The rotation of the engine is transmitted to a front differential case 52 through a ring gear 51 after the speed of rotation has been appropriately changed through an automatic transmission mechanism. In a normal running state, a clutch 53 for locking a center differential mechanism A is in a disengaged state, and in this state, the rotation of the front differential case 52 is transmitted through a first hollow shaft 55 to a differential carrier 57 in the center differential mechanism A and is further transmitted from a differential pinion 59 to left and right side gears 60 and 61. The rotation of the left side gear 60 is transmitted through a second hollow shaft 62 to a differential carrier 63 in a front differential mechanism B an is further transmitted from a differential pinion 65 to left and right side gears 66 and 67 from which the rotation is transmitted to left and right front wheel driving shafts 69 and 70. On the other hand, the rotation of the right side gear 61 is transmitted to a center differential case 71 which is in spline coupling to the gear 61, and the rotation is further transmitted to a drive pinion shaft 75 through ring gears 72 and 73 for driving the rear wheels and is then transmitted to left and right rear wheel driving shafts (not shown) through a propeller shaft and rear differential mechanism (not shown).

When relatively large drive power is required because the vehicle is running on a bad road such as a frozen, sandy or rough road, or when there is a fear of the wheels slipping, the clutch 53 is engaged to lock the center differential mechanism A. In this state, the rotation of the front differential case 52 is directly transmitted to the differential carrier 63 in the front differential mechanism B through the clutch 53 and is further transmitted from the differential pinion 65 to the left and right side gears 66 and 67 from which the rotation is transmitted to the left and right front wheel driving shafts 69 and 70. At the same time, the differential carrier 57 and left side gear 60 in the center differential mechanism A which are coupled to the front differential case 52 and the differential carrier 63 through the hollow shafts 55 and 62, respectively, are rotated together in one unit without performing any differential motion; and this rotation is further transmitted to the center differential case 71. Thus, rotation the speed of which is the same as the front wheel driving differential carrier 63 is transmitted to the rear wheel driving ring gear 72, and the right and left rear wheel driving shafts are thereby driven.

In general four-wheel drive vehicles include full-time four-wheel drive vehicles which are provided with center differential mechanisms as described above, and part-time four-wheel drive vehicles with no center differential mechanisms In the latter type of four-wheel drive vehicle, either the front or rear wheels are normally driven, and when relatively large drive power is required, for example, when the vehicle is running on a snow-covered road, the other wheels are appropriately coupled directly to the driving shaft through a clutch or the like, thus switching the two and four wheel drive modes from one to the other as desired.

There have heretofore been proposed techniques for preventing a vehicle from slipping by means of four-wheel drive. One example of such prior arts is applied to a part time four-wheel drive vehicle to prevent slipping by utilizing acceleration. According to this technique, when the vehicle is running in the two-wheel drive mode, an angular acceleration of rotation of the driving wheel is detected, and the detected value is compared with a reference value which is set in consideration of the change in drive power at the time the vehicle speed and load change. When the occurrence of slip is judged from the result of the comparison, the two-wheel drive mode is automatically switched to the four-wheel drive mode. More specifically, since drive power is determined by both vehicle speed and load and the degree of slip differs in accordance with the level of drive power, the reference value used for judgment of occurrence of slip is corrected on the basis of the detected level of drive power, and occurrence of slip is judged on the basis of the corrected reference value.

However, the acceleration (drive power) may differ for the same vehicle speed or load depending upon the vehicle running condition, for example, when the vehicle goes up and down a slope. The vehicle engine output for the same throttle opening also changes with time or season. For this reason, the above-described prior art suffers from the problem that it is impossible to primarily determine a critical reference value used for judgment and therefore the occurrence of slip cannot be accurately detected. The prior art further has the problem that, if the two-wheel drive mode carried out in a low-drive power state is suddenly switched to the four-wheel drive mode carried out in a high-drive power state on the judgment based on the comparison using a single reference value, the vehicle body is impacted greatly and a sudden change is caused in the behavior of the vehicle, which makes it difficult to ensure the adequate running and steering stabilities. This problem is common to the part-time and full-time four-wheel drive vehicles. More specifically, assuming that the driving wheels of a part-time four-wheel drive vehicle running in the two-wheel drive mode, or either the front or rear wheels of a full-time four-wheel drive vehicle, are slipping in the mud, if switching from the two-wheel drive mode to the four drive mode, or locking of the center differential mechanism, is effected on the basis of detection of the slipping, the drive power is suddenly increased, and this leads to a change in the behavior of the vehicle, such as undesirable rushing, and impacts which cause the vehicle body to swing.

SUMMARY OF THE INVENTION

It is an object of the present invention to prevent the occurrence of slip by the control of the degree of engagement of the front- and rear-wheel engaging mechanism.

It is another object of the present invention to detect the occurrence of slip highly accurately with a simplified arrangement.

It is still another object of the present invention to suppress a sudden change in the behavior of the vehicle body which may be caused when a low drive power state is switched to a high drive power state by detecting the occurrence of slip.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To attain the above-described object, the present invention provides a four-wheel drive vehicle having a front- and rear-wheel engaging mechanism designed to enable differential limiting means provided between front and rear wheels to be controlled over the range from the direct coupling position to the disengaged position through the sip region by the control of the degree of engagement, wherein the improvement comprises: engaging means for driving the front- and rear-wheel engaging mechanism at a set degree of engagement; wheel acceleration detecting means; reference acceleration detecting means; and control means for controlling the engaging means by setting a degree of engagement on the basis of the result of a comparison between the detected acceleration of rotation of the wheels and the detected reference acceleration. The above-described vehicle may be provided with acceleration detecting means for detecting accelerations of rotation of the front and rear wheels, and control means for controlling the engaging means by setting a degree of engagement on the basis of the result of a comparison between the detected accelerations of rotation of the front and rear wheels.

By virtue of the above-described arrangement, the present invention provides the following advantages. Since the engaging means is controlled with the degree of engagement which is changed in accordance with the result of comparison between the detected acceleration of rotation of the wheels and the detected reference acceleration, when the difference therebetween is extremely large because of the occurrence of slip, the front and rear wheels are directly coupled together; when the difference is medium, the front- and rear-wheel engaging means is engaged in such a manner as to be able to slip; and when there is no difference therebetween, the front- and rear-wheel engaging means is disengaged. Accordingly, it is possible to ensure the running stability.

According to the alternative form of the present invention, the occurrence of slip can be detected with a high degree of accuracy by making a comparison between the accelerations of rotation of the front and rear wheels, so that it is possible to quickly effect slip preventing control. More specifically, the acceleration of rotation of the wheels at the time of occurrence of slip differs remarkably from that in the case where there is no slip and the vehicle body is accelerated in this state. Accordingly, the comparison between the accelerations of rotation of the front and rear wheels produces a result which is proportional to the degree of slip, and it is possible on the basis of the comparison result to limit the operation of the differential mechanism in accordance with the slip condition in an early stage.

BRIEF DESCRIPTION OF THE DRAWINGS

FIG. 5 is a block diagram showing the arrangement of another embodiment of the present invention;

FIG. 6 is a chart showing one example of setting of hydraulic pressure carried out by the controller;

FIG. 8 is a sectional view showing in detail the power transmission mechanism shown in FIG. 7.

DESCRIPTION OF THE PREFERRED EMBODIMENTS

Preferred embodiments of the present invention will be described hereinunder in detail with reference to the accompanying drawings.

Figure 1:
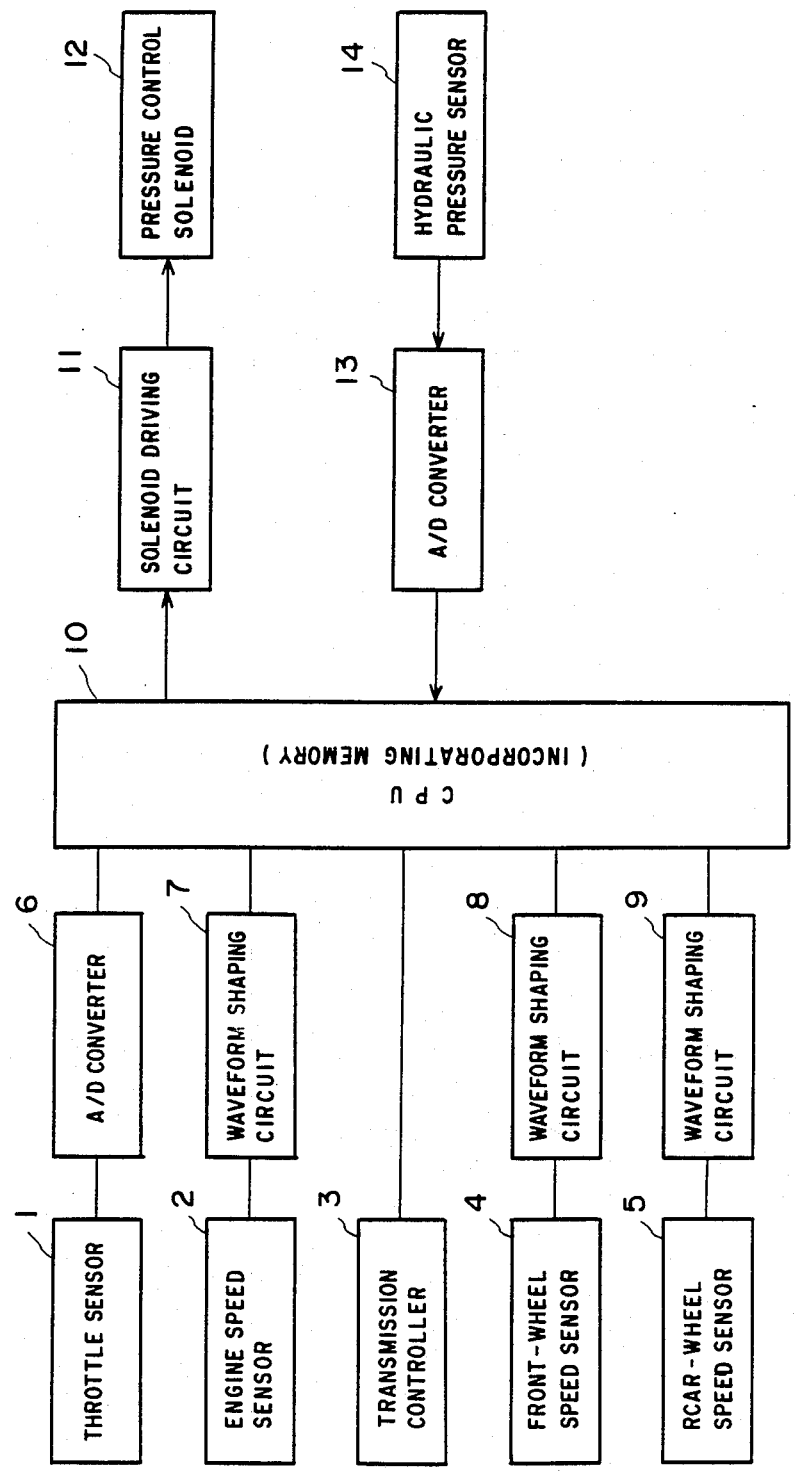
FIG. 1 shows the arrangement of one embodiment of an antislip apparatus mounted on a four-wheel drive vehicle according to the present invention.
Figures 2, 3:
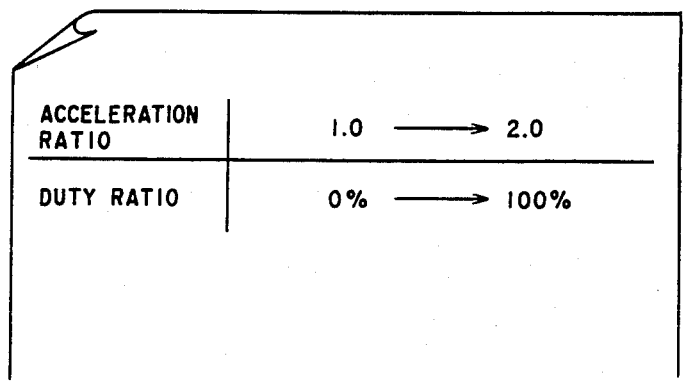
FIG. 2 shows one example of a reference acceleration map stored in the memory of the controller shown in FIG. 1.
FIG. 3 shows one example of a solenoid duty ratio map stored in the memory of the controller.

Referring to FIG. 1, the reference numeral 1 denotes a throttle sensor, 2 an engine speed sensor, 3 a transmission controller, 4 a front-wheel speed sensor, 5 a rear-wheel speed sensor, 6 and 13 A/D converters, 7 to 9 waveform shaping circuits, 10 a controller, 11 a solenoid driving circuit, 12 a pressure control solenoid, and 14 a hydraulic pressure sensor. The controller 10 is, for example, a CPU that incorporates a memory. The controller 10 has a reference acceleration map and a solenoid duty ratio map which are stored in the memory, and is arranged to read signals from the above-described sensors and control the pressure control solenoid 12 through the solenoid driving circuit 11. The hydraulic pressure sensor 14 and the A/D converter 13 constitute in combination a feedback circuit for controlling the pressure control solenoid 12 at a hydraulic pressure set in the controller 10. The reference acceleration map is, as shown in FIG. 2, formed so that a reference acceleration is obtained from the throttle opening engine speed and transmission gear position, while the solenoid duty ratio map is, as shown in FIG. 3, formed so as to obtain a solenoid duty ratio from the calculated acceleration ratio.

The flow of processing executed by the controller 10 will next be explained with reference to FIG. 4.

Figure 4:
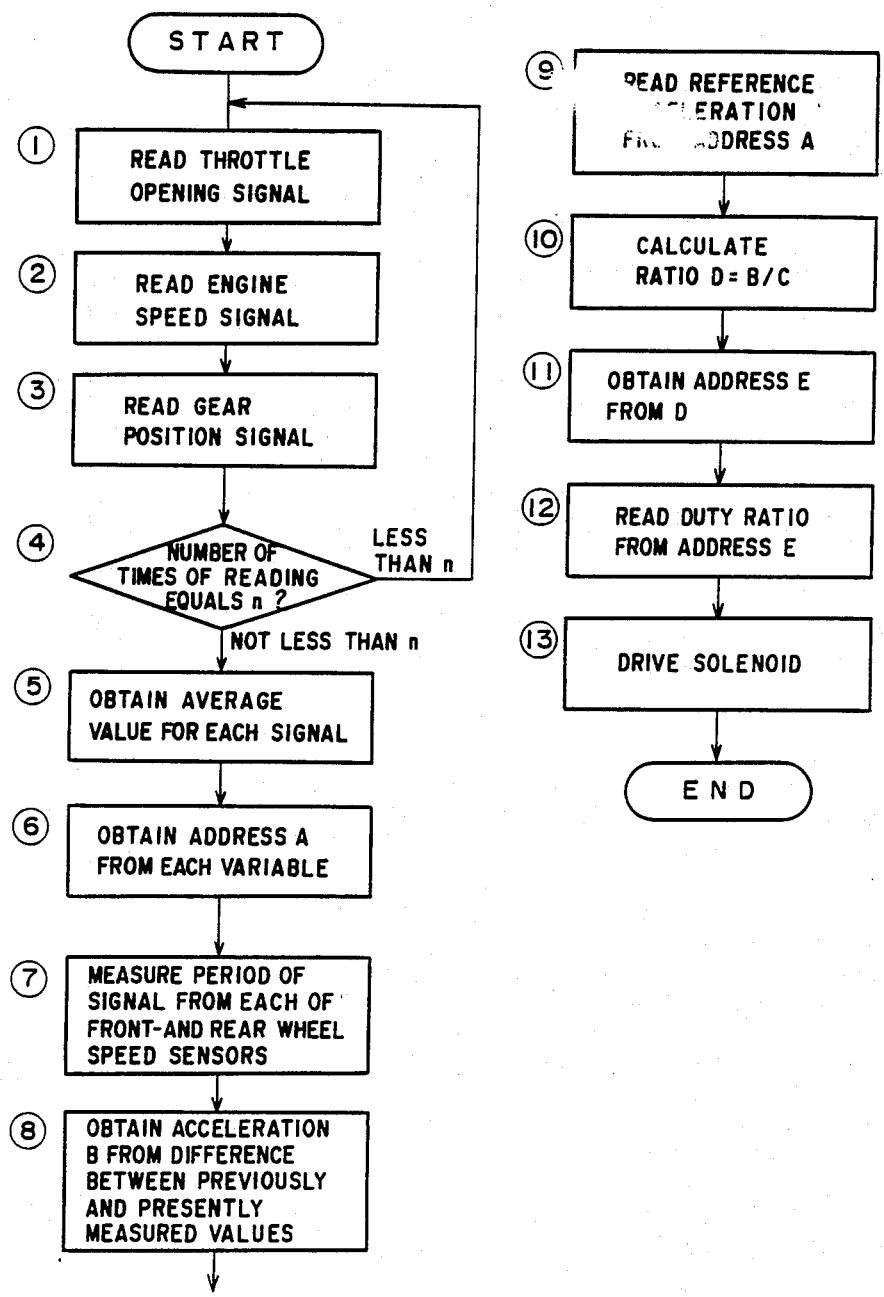
FIG. 4 is a flowchart showing the processing executed by the controller.
Figure 7:
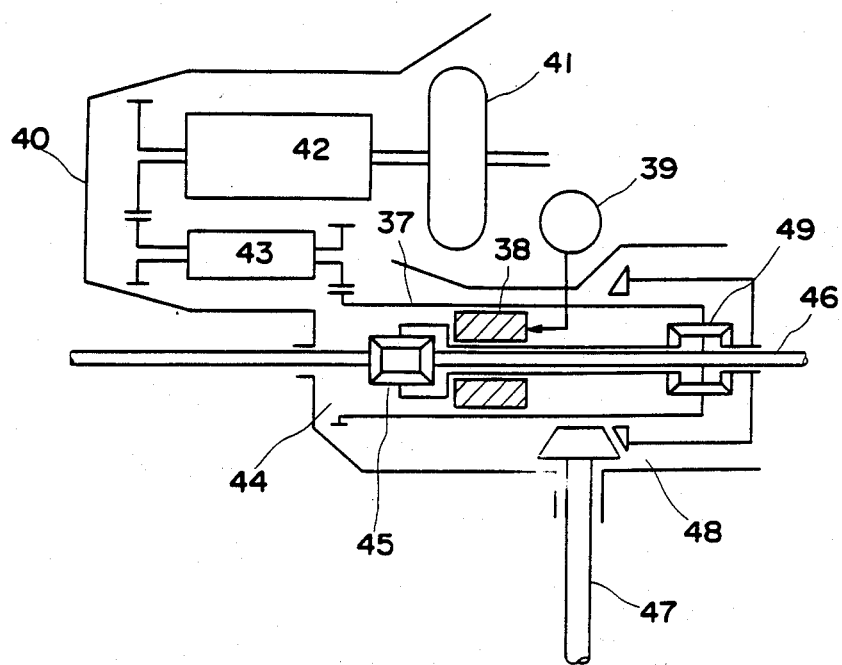
FIG. 7 schematically shows a power transmission mechanism employed in a full-time four-wheel drive vehicle with a center differential mechanism which has an engine mounted on the front side.

As shown in FIG. 4, first, a throttle opening signal from the throttle sensor 1, an engine speed signal from the engine speed sensor 2, and a gear position signal from the transmission controller 3 are read a predetermined number n of times, and an average value for each signal is obtained ① to ⑤.

Thereafter, an address A for reading the reference acceleration map is obtained from the average values of the signals ⑥.

Subsequently, signals from the front- and rear-wheel speed sensors 4 and 5 are read to measure the period of each signal and calculate a difference between the previously and presently measured values, thereby obtaining an acceleration B of rotation of the wheels ⑦, ⑧

With the address A, a reference acceleration C is read from the map stored in the memory to calculate a ratio D of the wheel acceleration B to the reference acceleration C, i.e., D=B/C, and an address E for reading the solenoid duty map is obtained from the acceleration ratio D ⑨ to ⑪.

With the address E, a solenoid duty ratio is read from the map stored in the memory, and the solenoid driving circuit 11 is controlled with the read duty ratio ⑫, ⑬.

In the above-described processing, the wheel acceleration B and the acceleration ratio D are obtained for each of the front and rear wheels, and the acceleration ratio in relation to the wheels which have a larger ratio is employed to obtain an address E. Then, the solenoid driving circuit 11 is controlled with a solenoid duty ratio read from the address E.

Another embodiment of the present invention will be described below.

In this embodiment, the controller 10 is arranged to read signals from the front- and rear-wheel speed sensors 4 and 5, obtain a ratio of the accelerations of rotation of the front and rear wheels, further obtain a solenoid duty ratio from the acceleration ratio, and control the solenoid driving circuit 11 with the obtained duty ratio. It should be noted that noise eliminating circuits may be provided between the front- and rear-wheel speed sensors 4, 5 and the waveform shaping circuits 8, 9, respectively, in order to eliminate noise and shape each signal into a rectangular wave so that the signals from the sensors 4 and 5 can be processed in the controller 10.

A practical arrangement of the controller 10 and one example of processing executed thereby will next be described with reference to FIG. 5.

In FIG. 5, the reference numeral 21 denotes a section to which is input a rectangular wave signal from the front-wheel speed sensor, 22 and 25 period measuring sections, 23 and 26 averaging sections, 24 a section to which is input a rectangular wave signal from the rear-wheel speed sensor, 27 a section for calculating an acceleration ratio or difference, 28 an address translation section, 29 a solenoid duty ratio read section, 30 a section for storing a map used to set hydraulic pressure, 31 a hydraulic pressure signal supply section, 32 a duty ratio decision section, and 33 a solenoid drive section.

First, rectangular signals from the front- and rear-wheel speed sensors 4 and 5 shown in FIG. 1 are input through the noise eliminating circuits and the waveform shaping circuits 8, 9, and periods are measured in the period measuring sections 22 and 25. Thereafter, an average value is obtained with respect to the amount of change in each period, i.e., $\Delta S = (S_{ti} - S_{ti-1})/t$, for n periods in each of the averaging sections 23 and 26. In other words, the average values thus obtained are average accelerations $\alpha_f$ and $\alpha_r$ for n periods.

After the accelerations $\alpha_f$ and $\alpha_r$ relative to the front and rear wheels have been obtained, an acceleration ratio $\alpha_f/\alpha_r$ or an acceleration difference $\alpha_f$-$\alpha_r$ is calculated in the calculating section 27. The obtained acceleration ratio or difference is translated into an address with which a solenoid duty ratio is read from the hydraulic pressure setting map stored in the section 30.

The hydraulic pressure setting map is, for example, formed so that the hydraulic pressure is set at 0 when the acceleration ratio is at and near 1 where the front and rear wheels have the same acceleration, and the hydraulic pressure gradually rises as the acceleration ratio increases from 1 and also as the ratio decreases from 1, as shown in FIG. 6. In other words, the hydraulic pressure is controlled in such a manner that, as the acceleration ratio diverges from 1, the degree of engagement between the front and rear wheels is increased. The hydraulic pressure may be set so as to change in linear or functional relation to the acceleration ratio. Further, a dead zone having a predetermined width $\Delta W$ may be provided at and near the acceleration ratio 1 since, when slip occurs, the acceleration ratio takes a value that deviates from 1 to a certain extent. The same is the case with setting of a map on the basis of the acceleration difference.

After a solenoid duty ratio has been read from the map, the hydraulic pressure signal is controlled in accordance with the read duty ratio (e.g., 30%), thereby driving the solenoid 12.

In general, when the vehicle is running on a road surface having a low coefficient of friction, there is substantially no possibility of the front and rear wheel simultaneously exceeding the gripping limit because of non uniform distribution of load and variations in coefficient of friction. If the front and rear wheels slip at the same time, locking of the center differential mechanism is not effective in suppressing the slip. When slip occurs, the tire and the associated driving mechanism are accelerated as compared with the case where the vehicle is accelerated in a non-slip state, and therefore the acceleration of rotation of the slipping wheel becomes extremely high. Accordingly, in the present invention, two of the vehicle speed sensor and the front- and rear-wheel speed sensors are employed to compare rates of change per unit of time, thereby judging the degree of slip, and the hydraulic pressure is varied in a multistage manner over the range from 0% to 100% on the basis of the judgment of the degree of slip. While doing so, the differential limiting mechanism for the center differential mechanism is actuated, whereby the vehicle is effectively prevented from slipping.

It should be noted that the present invention is not necessarily limitative to the above described embodiment and various changes and modifications may be imparted thereto.

For example, although in the described embodiment the front and rear-wheel engaging mechanism is applied to a full-time four wheel drive vehicle with a center differential mechanism, it may similarly be applied to a part-time four-wheel drive vehicle. The front- and rear-wheel engaging mechanism in this case is designed to enable the differential limiting means provided between the front and rear wheels to be controlled over the range from the direct coupling position to the disengaged position through the slip region by the control of the degree of engagement. In the case of a full-time four wheel drive vehicle, the mechanism is a clutch for locking the center differential mechanism; in the case of a part-time four-wheel drive vehicle, the mechanism is a center clutch for directly coupling the front and rear wheels. More specifically, the clutch is not necessarily limited to the hydraulic clutch, and it is possible to employ any type of clutch which is capable of controlling the degree of engagement, such as an electromagnetic clutch. The reference acceleration may be obtained from reference data (map) prepared on the basis of the throttle opening and the vehicle speed since the vehicle is generally accelerated by means of the engine output. The arrangement may be such that an acceleration sensor is mounted on the vehicle body, for example, under the front passenger's seat where the sensor is least affected by the vibrations of the engine and suspension, so as to use a signal output from the acceleration sensor as a reference acceleration. In the case where a reference acceleration is obtained from reference data prepared using the throttle opening as one variable, a plurality of reference data may be set so as to enable selection of one of them in accordance with mileage or in response to a switching operation or on the basis of the result of measurement of the open air temperature, since, even for the same throttle opening, the corresponding acceleration may change in accordance with mileage and the number of years (i.e., change with time) and, when the open air temperature changes with season, the amount of supplied oxygen may change to lead to variations in the output horsepower, i.e., acceleration. The reference data may be referred to using an address which is determined by the difference between the wheel acceleration and the reference acceleration.

As will be clear from the foregoing description, when a wheel which is slipping is to be returned to a normal number of revolutions, the inertia accumulated in the members of the driving system is released and an output larger than the engine output may be generated. Therefore, the sudden engagement of the front- and rear-wheel engaging mechanism causes the output to be peaked, resulting in a sudden change in the behavior of the vehicle. According to the present invention, however, the degree of engagement is changed in accordance with the ratio or difference between the wheel acceleration and the reference acceleration. It is therefore possible to gradually change the degree of engagement in such a manner that, if the degree of slip is low, the degree of engagement is decreased, whereas, if the degree of slip is high, the degree of engagement is increased. Accordingly, the inertia energy is gradually absorbed, and the change in the behavior of the vehicle is thereby minimized. Further, it is possible to detect slip accurately and easily using an engine speed sensor only without the need to employ a throttle sensor or the like. In addition, since it is possible to adjust the degree of engagement of the front- and rear-wheel engaging mechanism in accordance with the degree of slip from the early stage of occurrence of the slip, the degree of engagement can be smoothly changed, so that it is possible to avoid occurrence of an undesirable phenomenon such as rushing of the vehicle which would otherwise be caused by suddenly directly coupling together the front and rear wheels by the operation of the front- and rear-wheel engaging mechanism when slipping is occurring. Accordingly, it is possible to improve the running and steering stabilities.

What is claimed is:

1. A four-wheel drive vehicle comprising a front- and rear-wheel engaging mechanism designed to enable differential limiting means provided between front and rear wheels of the vehicle to be controlled over a range from a direct coupling position to a disengaged position through a slip region by the control of a degree of engagement;

engaging means for driving said front- and rear-wheel engaging mechanism at a set degree of engagement;

acceleration detecting means for detecting an acceleration of rotation of the wheels and a reference acceleration acting on the vehicle body; and control means for controlling said engaging means by setting the degree of engagement on the basis of the result of a comparison between the detected acceleration of rotation of the wheels and the acceleration acting on the vehicle body.

2. A four-wheel drive vehicle according to claim 1, which has a center differential mechanism for absorbing a difference in terms of the radius of rotation between the front and rear wheels, said center differential mechanism being disposed in parallel to said front- and rear-wheel engaging mechanism.

3. A four-wheel drive vehicle according to claim 1, wherein said control means has reference data concerning degrees of engagement respectively corresponding to values resulting from the comparison between the acceleration of rotation of the wheels and the reference acceleration and sets a degree of acceleration on the basis of said reference data.

4. A four-wheel drive vehicle according to claim 3, wherein said comparison values are differences between the acceleration of rotation of the wheels and the reference acceleration.

5. A four-wheel drive vehicle according to claim 3, wherein said comparison values are ratios of the acceleration of rotation of the wheels and the reference acceleration.

6. A four-wheel drive vehicle according to claim 1, wherein said control means has reference data used to obtain a reference acceleration on the basis of a signal detected by the reference acceleration detecting means.

7. A four-wheel drive vehicle according to claim 6, wherein said reference acceleration detecting means is defined by a throttle sensor, an engine speed sensor and transmission gear position detecting means.

8. A four-wheel drive vehicle according to claim 6, wherein said reference acceleration detecting means is defined by a throttle sensor and a vehicle speed sensor.

9. A four-wheel drive vehicle according to claim 1, wherein said reference acceleration detecting means is defined by an acceleration sensor.

10. A four-wheel drive vehicle according to any one of claim 1, wherein the degree of engagement is set in terms of the duty ratio for driving said engaging means.

11. A four-wheel drive vehicle according to claim 1, wherein said acceleration detecting means detects accelerations of rotation of the front and rear wheels, and said control means regards the acceleration of rotation of either the front or rear wheels as the acceleration acting on the vehicle body and compares the accelerations with each other.

12. A four-wheel drive vehicle according to claim 11, wherein said control means has reference data concerning degrees of engagement respectively corresponding to values resulting from the comparison between the accelerations of rotation of the front and rear wheels.

13. A four-wheel drive vehicle according to claim 12, wherein said comparison values are ratios of the accelerations of rotation of the front and rear wheels.

14. A four-wheel drive vehicle according to claim 12, wherein said comparison values are differences between the accelerations of rotation of the front and rear wheels.

15. A four-wheel drive vehicle according to claim 11, wherein the degrees of engagement is set in terms of the duty ratio for driving said engaging means.

16. A four-wheel drive vehicle comprising:

a front- and rear-wheel engaging mechanism designed to enable differential limiting means provided between front and rear wheels of the vehicle to be controlled over a range from a direct coupling position to a disengaged position through a slip region by control of a degree of engagement.

engaging means for driving said front- and rear-wheel engaging mechanism at a set degree of engagement;

means for detecting an acceleration of rotation of the wheels;

means for detecting a reference acceleration indicating an acceleration of the vehicle; and control means for controlling said engaging means by comparing the detected acceleration of rotation of the wheels with the indicated reference acceleration by setting the degree of engagement having a magnitude corresponding to the compared value.

* * * * *